Patented Mar. 29, 1932

1,851,951

UNITED STATES PATENT OFFICE

THEODORE WILLIAMS DIKE, OF NEW WESTMINSTER, BRITISH COLUMBIA, CANADA, ASSIGNOR TO I. F. LAUCKS, INC., OF SEATTLE, WASHINGTON, A CORPORATION OF WASHINGTON

GLUING PROCESS

No Drawing.    Application filed May 26, 1930. Serial No. 455,978.

In gluing practice, where operating with a water-dispersible gluing agent, as blood-albumin, various difficulties have attended the use of such type of adhesive. One serious difficulty has been that penetration-loss into the wood occurred to such an extent as to in many areas leave a deficiency of adhesive at the glue line, as well as to cause serious staining if the plies were thin. In contrast with such prior practice, the present invention however, makes possible the application of highly dispersible adhesives in a manner to avoid difficulties both in the matter of penetration and lack of uniformity. In accordance with the invention, furthermore, particularly efficient and effective gluing procedures are made possible.

As adhesive base material, I employ such a dispersible protein as blood, animal glue, egg albumen, lactalbumen, etc. Preferably I apply this in discrete particle form, and conveniently for instance by dusting or sprinkling the dry powder onto the required surface.

In the case of materials already carrying moisture as in green veneer coming from the veneer cutting machine, addition of moisture is unnecessary. In some instances, the amount of moisture may be excessive and may desirably be eliminated by mechanical or heat drying. Where the surfaces to be united are dry, a small amount of moisture may be supplied by brushing, spraying, or any suitable procedure, before, after or with the adhesive base. The greater the amount of moisture, the greater will be the tendency toward penetration and the greater the need of checking the penetration of an adhesive which is dispersible thereby.

As a control of penetration there may be employed what for conciseness I term "penetration-checking agents". Among these are coagulatory-chemical compounds in suitably restricted amounts. Preferably, however, the invention contemplates the provision of non-dispersible adhesive base material, as for instance casein, gluten or other non-dispersed protein, such as the segregated or isolated protein from oil seed flours such as soya bean, hemp seed, castor, etc., or seed flours, particularly flour from the residue of oleaginous seeds from which the oil has been removed. Examples of this are flour or meal made from the cake or residue of soya bean, cottonseed, peanuts, flaxseed, perilla seed, hemp seed, rape seed, copra, tung nuts, castor bean, linseed, etc. These are applied preferably in admixture with the dispersible protein, but may be applied before or after or both in some instances. The amount of penetration-checking agent may vary, depending upon the conditions presented by different surfaces to be glued, porous absorptive surfaces, for instance, requiring more than dense, less absorptive surfaces. In the case of a non-dispersed protein as such agent, I may employ 10–50 per cent, or more, for example.

As above set forth, moisture contained in one or more of the plies, or applied thereto in any suitable manner, is provided. As will be understood, the proportion of the dispersible and the non-dispersible adhesive bases to each other may be varied widely, the non-dispersible base utilized acting in accordance with its moisture absorbtive and adherent properties. In its preferred form, however, the invention contemplates the use of a proportion of the non-dispersible adhesive base to the dispersible adhesive base and to the moisture present, which is at least sufficient to limit penetration and avoid a starved joint.

A variety of desirable products may be produced in accordance with the invention. Among them is a product wherein firmly united plies have at their adjacent surfaces occasional discrete particles of adhesive material and blood stains.

With the adhesive base applied, the elements to be glued are assembled and are subjected to pressure and heat, for example. Pressure may vary, depending upon the materials being glued, but may range from about 40 to 300 pounds per square inch. Relatively soft woods require less pressure than dry and hard woods, and in general the pressure limits are somewhat determined by the particular product in view and by the possible crushing of the wood structure. As an example, a wet cottonwood assembly is satisfactorily treated at about 40 pounds pressure per square inch, while dry yellow birch may be treated at about 300 pounds per square inch pressure.

Heat may be employed, and is desirable in a number of instances. For example, an assembly may be heated at a temperature of about 160 degrees F., this coagulating the protein. Higher temperatures may be advantageously applied however, particularly since the drying out of the assemblage is also facilitated. Some penetration-checking agents also further act as insolubilizers; and such agents as bi-chromates, chromates, chromealum, alums generally, tannic acid, gallic acid, etc., may be employed to advantage in some instances.

When admixtures of dispersible and non-dispersible materials are utilized other materials may be included, if desired. As an example of such a composition, reference is made to a dry composition of about 52.5 parts soluble blood albumen and 57.5 parts soya bean flour, 17 parts hydrous tri-sodium phosphate crystals and 15 parts of hydrated lime, which may be utilized in suitable proportion, a generally similar proportion of water being provided. In the formation of plywood the above composition, for example, may be applied to a wood ply, moisture being applied if necessary, another wood ply superposed, the composition applied, moisture being applied if necessary, the assembly completed by superposing another wood ply, and subjected to a two minute treatment at about 270 degrees F. and a pressure of about 200 pounds.

It will thus be seen that with adhesive bases of a type ordinarily known to give much trouble by reason of overready dispersibility, the action of the gluing agent may be controlled to a uniform exactness, the penetration of the adhesive being checked as desirable through the time of assembly or period prior to application of pressure, as well as during the pressing. Wood and other materials as well which are capable of being bound together by an adhesive may thus be readily glued; with a corresponding absence of the obstacles characteristic of the old methods. Nor is it necessary that the materials glued together be of definite geometric shape.

It is to be understood that reference herein to the dispersible or non-dispersible character of an adhesive base refers to the tendency of such substance to form a dispersion in water.

While the use of mixtures of adhesive bases such as blood albumen and soya bean flour has been particularly disclosed as primarily designed for limiting the penetration of the blood albumen, or the like, it is to be understood that the invention embraces the conjoint use of these or similar materials for such other or supplementary purposes, and in such proportions for these purposes, as may be desirable. One example of such a purpose is to secure a preliminary adhesion before final setting, for instance as set forth and claimed in the co-pending application of Harry Galber, Serial No. 594,857 filed Feb. 24, 1932.

It is further to be understood that the term "non-dispersible" as used herein to describe adhesive base material does not exclude materials containing proportions of dispersible ingredients.

This application is a continuation in part of my application Serial No. 335,998, filed January 29, 1929.

The following applications are continuations in part of the present case: Serial No. 518,944, filed February 28, 1931; and Serial No. 538,983, filed May 21, 1931.

Reference is likewise made to the following applications which are also continuations in part of said application Serial No. 335,998: Serial No. 454,832, filed May 22, 1930; Serial No. 455,977 filed May 26, 1930; Serial No. 456,813, filed May 28, 1930; Serial No. 456,814, filed May 28, 1930; Serial No. 565,929, filed September 29, 1931; and Serial No. 565,930, filed September 29, 1931.

Other modes of applying the principle of the invention may be employed, change being made as regards the details described, provided the features stated in any of the following claims, or the equivalent of such, be employed.

I therefore particularly point out and distinctly claim as my invention:—

1. A process of gluing, which comprises supplying to a superficially moistened surface to be so incorporated dry powdered blood albumen and an independent penetration-checking agent, assembling, and applying heat and pressure.

2. A process of gluing, which comprises supplying to a surface to be so incorporated a powdered dispersible adhesive base and a non-dispersible adhesive base, assembling, and applying heat and pressure, the proportion of the non-dispersible adhesive base to the dispersible adhesive base, and to the moisture present being at least sufficient to limit penetration and to avoid a starved joint.

3. A process of gluing, which comprises moistening a surface to be so incorporated, supplying a powdered dispersible adhesive base and a non-dispersible adhesive base, assembling, and applying heat and pressure, the proportion of the non-dispersible adhesive base to the dispersible adhesive base, and to the moisture present being at least sufficient to limit penetration and to avoid a starved joint.

4. A process of gluing, which comprises supplying to a surface to be so incorporated dry powdered blood albumen and a seed flour, assembling, and applying heat and pressure, the proportion of the seed flour to the blood albumen and to the moisture present being at least sufficient to limit penetration and avoid a starved joint.

5. A process of gluing, which comprises moistening a surface to be so incorporated, supplying dry powdered blood albumen, and a seed flour, assembling, and applying heat and pressure, the proportion of the seed flour to the blood albumen and to the moisture present being at least sufficient to limit penetration and avoid a starved joint.

6. A process of gluing, which comprises supplying to a surface to be so incorporated dry powdered blood albumen and soya bean flour, assembling, and applying heat and pressure, the proportion of the soya bean flour to the blood albumen and to the moisture present being at least sufficient to limit penetration and avoid a starved joint.

7. A process of gluing, which comprises moistening a surface to be so incorporated, supplying dry powdered blood albumen and soya bean flour, assembling, and applying heat and pressure, the proportion of the soya bean flour to the blood albumen and to the moisture present being at least sufficient to limit penetration and avoid a starved joint.

8. A ply structure of the character described, which comprises layers bound together by interposed dispersible protein and non-dispersible proteinous material both supplied in discrete particle form and pressed in the presence of moisture and heat.

9. A process of gluing with an adhesive of dispersible character, which comprises supplying powdered blood albumen to a surface to be glued, supplying moisture, checking penetration, assembling, and applying pressure and heat.

10. A process of gluing with an adhesive of dispersible character, which comprises supplying powdered blood albumen to a moist surface to be glued, supplying an independent penetration-checking agent, assembling, and applying pressure.

11. Plywood comprising layers bound together by interposed blood albumen and non-dispersible proteinous material both supplied in discrete particle form and pressed under heat, the penetration being limited.

12. A ply structure of the character described, which comprises layers bound together by interposed dispersible protein and an oil seed flour both supplied in discrete particle form, and pressed in the presence of moisture and heat.

13. A ply structure of the character described, which comprises layers bound together by interposed blood albumen and oil seed flour both supplied in discrete particle form, and pressed in the presence of moisture and heat.

14. A ply structure of the character described, comprising layers of material having interposed bond materials comprising a set mixture of a dispersible protein and a non-dispersible adhesive material.

15. Plywood comprising wooden members glued together having at their adjacent surfaces occasional discrete particles of adhesive material and blood stains.

16. A process of gluing which comprises supplying an adhesive of dispersible character in powdered form to a moist surface to be incorporated, supplying with the adhesive an agent having penetration-checking properties exerted in the absence of heat, assembling, and applying heat and pressure.

17. A process of gluing which comprises supplying an albuminous adhesive in powdered form to a moist surface to be incorporated, supplying with the adhesive an agent having penetration-checking properties exerted in the absence of heat, assembling, and applying heat and pressure.

18. A process of gluing which comprises supplying powdered blood albumen to a moist surface to be incorporated, supplying therewith an agent having penetration-checking properties exerted in the absence of heat, assembling and applying heat and pressure.

19. A process of gluing which comprises supplying an adhesive of dispersible character to a surface to be glued, supplying in powdered form a non-dispersible adhesive material having moisture absorbent properties, moisture being provided at the glue line, assembling and applying pressure and setting the adhesive.

20. A process of gluing which comprises supplying to a surface to be incorporated an albuminous adhesive base and a non-dispersible adhesive base in non-dispersed condition, assembling and subjecting to pressure and heat, moisture being suitably provided.

21. A process of gluing which comprises supplying to a surface to be incorporated blood albumen and a non-dispersible adhesive base in non-dispersed condition, assembling and subjecting to pressure and heat, moisture being suitably provided.

22. A process of gluing which comprises supplying to a surface to be incorporated an albuminous material and a seed flour, assembling and subjecting to pressure and heat, moisture being suitably provided.

23. A process of gluing which comprises supplying to a surface to be incorporated an albuminous material and a non-dispersible proteinous adhesive base in non-dispersed condition, assembling and subjecting to pressure and heat, moisture being suitably provided.

24. A process of gluing which comprises supplying to a surface to be incorporated blood albumen and undispersed vegetable proteinous adhesive base, assembling and subjecting to pressure and heat, moisture being suitably provided.

25. A process of gluing which comprises supplying to a surface to be incorporated blood albumen and undispersed soya bean flour, assembling and subjecting to pressure and heat, moisture being suitably provided.

26. A process of gluing which comprises supplying to a surface to be incorporated blood albumen and undispersed casein, assembling and subjecting to pressure and heat, moisture being suitably provided.

27. A process of gluing which comprises supplying to a surface to be incorporated a powdered dispersible adhesive base and a non-dispersible adhesive base in discrete particle form, assembling and subjecting to bonding conditions, moisture being suitably provided.

28. A process of gluing, which comprises applying to a surface to be incorporated a powdered dispersible adhesive base and an oil seed flour, assembling and subjecting to bonding conditions, moisture being suitably provided.

29. A process of gluing which comprises supplying to a surface to be incorporated blood albumen and soya bean flour, both in powdered form, assembling and subjecting to bonding conditions, moisture being suitably provided.

30. A process of gluing which comprises supplying to a surface to be incorporated blood albumen and casein, both in powdered form, assembling and subjecting to bonding conditions, moisture being suitably provided.

31. A process of gluing which comprises supplying to a surface to be incorporated an albuminous material in powdered form and an adhesive of non-dispersible character in non-dispersed condition and an alkaline reagent, assembling and subjecting to pressure and setting the adhesive, moisture being suitably provided.

32. A process of gluing which comprises supplying to a surface to be incorporated powdered blood albumen and a vegetable proteinous material in non-dispersed condition and an alkaline re-agent, assembling and subjecting to pressure and setting the adhesive, moisture being suitably provided.

33. A process of gluing which comprises supplying to a surface to be incorporated powdered blood albumen and powdered soya bean flour and an alkaline re-agent, assembling and subjecting to pressure and setting the adhesive, moisture being suitably provided.

34. A process of forming plywood, which comprises applying to a wood-ply dry powdered blood albumen and a non-dispersible adhesive base in powdered form, superposing another wood-ply, applying dry powdered blood albumen and a non-dispersible adhesive base in powdered form, superposing another wood-ply, and subjecting the assembly to heat and pressure, moisture being suitably provided.

35. A process of forming plywood, which comprises applying to a wood-ply dry powdered blood albumen and an oil seed flour, superposing another wood-ply, applying dry powdered blood albumen and an oil seed flour, superposing another wood-ply, and subjecting the assembly to heat and pressure, moisture being suitably provided.

36. A process of forming plywood, which comprises applying to a wood-ply dry powdered blood albumen and soya bean flour, superposing another wood-ply, applying dry powdered blood albumen and soya bean flour, superposing another wood-ply, and subjecting the assembly to heat and pressure, moisture being suitably provided.

37. A process of gluing, which comprises supplying to a surface to be incorporated animal glue in powdered form and a non-dispersible adhesive base in discrete-particle form, assembling and subjecting to bonding conditions, moisture being suitably provided.

38. A process of gluing, which comprises supplying in powdered form to a surface to be incorporated animal glue and casein, assembling and subjecting to bonding conditions, moisture being suitably provided.

Signed by me, this 12th day of May, 1930.

THEODORE WILLIAMS DIKE.